United States Patent [19]

Palbiski et al.

[11] Patent Number: 5,220,812

[45] Date of Patent: Jun. 22, 1993

[54] METHOD FOR COOLING CARCASSES

[75] Inventors: Clay Palbiski; Sid Engler, both of Scarborough, Canada

[73] Assignee: Liquid Carbonic Inc., Scarsborough, Ontario, Canada

[21] Appl. No.: 798,484

[22] Filed: Nov. 26, 1991

[51] Int. Cl.⁵ .................. F25D 13/06; F25D 25/02
[52] U.S. Cl. ................................. 62/381; 62/63
[58] Field of Search ............... 62/62, 336, 345, 374, 62/378, 63, 64, 381

[56] References Cited

U.S. PATENT DOCUMENTS

| | | | |
|---|---|---|---|
| 2,942,429 | 6/1960 | Van Dolah et al. | 62/381 X |
| 3,097,501 | 7/1963 | Pappas | 62/381 X |
| 3,292,384 | 12/1966 | Rubin | 62/381 X |
| 3,340,696 | 9/1967 | Zebarth et al. | 62/63 |
| 3,395,549 | 8/1968 | Grimes | 62/381 X |
| 3,426,546 | 2/1969 | Crane | 62/63 |
| 3,446,030 | 5/1969 | Rubin | 62/63 |
| 3,468,135 | 9/1969 | Doll et al. | 62/63 |
| 3,623,331 | 11/1971 | Buyens | 62/63 |
| 3,689,958 | 9/1972 | Dillon | 62/63 X |
| 3,715,891 | 2/1973 | Martin | 62/63 |
| 4,028,774 | 6/1977 | Allan et al. | 62/63 X |
| 4,033,142 | 7/1977 | Schorsch et al. | 62/381 |
| 4,367,630 | 1/1983 | Bernard et al. | 62/63 |
| 4,388,811 | 6/1983 | Zebarth | 62/63 |
| 4,476,686 | 10/1984 | Madsen et al. | 62/381 X |
| 5,036,673 | 8/1991 | Miller et al. | 62/381 X |

FOREIGN PATENT DOCUMENTS

| | | | |
|---|---|---|---|
| 552578 | 2/1958 | Canada | 62/63 |
| 516882 | 10/1976 | U.S.S.R. | 62/381 |
| 1278602 | 6/1972 | United Kingdom | 62/381 |

*Primary Examiner*—Henry A. Bennet
*Assistant Examiner*—C. Kilner
*Attorney, Agent, or Firm*—Jeffrey T. Imai; Arne I. Fors; D. Doak Horne

[57] ABSTRACT

A method for chilling carcasses which comprises the steps of introducing a cryogenic fluid into a rotatable drum of a meat tumbler, the drum having inner walls which are cooled by the cryogenic fluid; placing carcasses to be chilled inside the drum; and rotating the drum so that the carcasses contact each other and the inner walls until they are chilled to a sufficient degree. The cryogenic fluid cools the drum to a temperature of approximately 32° F. A small quantity of water may be introduced into the drum of the tumbler either immediately before or immediately after the introduction of the cryogenic fluid. The water forms an ice layer on the inner walls to prevent the carcasses from sticking to the inner walls. The primary chilling of the carcasses takes place between the tumbling carcasses and the cold inner walls and/or ice layer. The carcasses may also be tumbled in the drum in an inert gas or vacuum atmosphere to massage surface moisture back into the carcasses.

21 Claims, No Drawings

METHOD FOR COOLING CARCASSES

BACKGROUND OF THE INVENTION

This invention relates generally to a method for chilling carcasses and more specifically to a method for chilling poultry carcasses utilizing a tumbling process, which process results in chilled poultry carcasses which are at an ideal storage and transportation temperature with minimum product deterioration.

SUMMARY OF THE PRIOR ART

Various processes are available for the production of fresh poultry carcasses. The term "fresh" in this disclosure is used to denote carcasses which are not frozen but which are at a temperature sufficiently low enough to substantially prevent deterioration of the meat. The temperature of a "fresh" carcass is in the region of 28° F.–34° F.

After slaughtering, carcasses must be cooled fairly rapidly to a temperature which is low enough to substantially prevent bacterial growth, i.e. to around 32° F.–34° F. Conventional air chiller systems have been used in the past to effect this cooling. In these systems, carcasses are disposed on a conveyer or on shackle line and passed through a 32° F.–35° F. air cooled chamber, where after some 90–120 minutes, or longer for larger size carcasses, they emerge at a temperature of between 34° F.–35° F. Exposure to the air for this length of time causes a loss of some of the original fluids due to evaporation.

To overcome this problem, methods of processing have been developed which include a brief period of rapid freezing of the exterior surface of the carcasses. This substantially prevents moisture loss from the carcasses during later processing. U.S. Pat. No. 4,028,774, granted to Allan et al on Jun. 14, 1977, discloses that this exterior freezing is achieved by blowing cold air on the carcasses. U.S. Pat. No. 4,325,221, granted to Grewar on Apr. 20, 1982, discloses the use of a cryogenic fluid sprayed on the carcasses. A method of crust freezing the outermost layers of the carcass by immersing the same in a cryogenic fluid bath is taught by U.S. Pat. No. 4,367,630, granted to Bernard et al on Jan. 11, 1983.

In essentially all of the above processes, temperatures well below 32° F. are used to freeze the exterior surface of the carcasses or a layer of moisture surrounding the exterior surface of the carcasses. The moisture retained by the carcasses is either in the form of natural fluids, or moisture added by means of subjecting the carcasses to water sprays or immersion in water chillers.

Equilibration tunnels or extended shackle lines are included in the processing area to allow the temperature of these chilled carcasses to equalize, or equilibrate, after they exit the freezer area. This requires a substantial outlay of capital on the part of the processor. For chickens, for example, the volume of carcasses processed, (up to 8,000 birds per hour or more), the length of the conveyor or shackle line involved, and the cost of the area for chilling the carcasses become major hurdles to processors installing this type of system. An 8,000 bird per hour line requiring 120 minutes of chilling would require 8,040' of shackle lines, (based on each carcass requiring 6" of space), plus the associated refrigeration system, considerable space to install the same, and the required capital investment.

Once the carcasses are subjected to temperatures above 32° F. during subsequent storage, transportation and retailing, the moisture retained by the abovementioned processes tends to be lost, and is generally found as free water, usually reddish in colour, in the packaging of the product. This presents an unsatisfactory product from an appearance point of view, and the customer also buys the wasted fluids at the price of the poultry meat.

In addition to the above, various parts of the carcasses, especially the wings in the case of poultry, tend to freeze during processing. This results in the necessity for a long equilibration time to allow the frozen parts to thaw so that they can be manipulated in machines designed to either cut and/or package the same. Freezing of the exterior surface and any subsequent storage of poultry carcasses especially, tends to dehydrate and discolour the skin, making the end product less saleable.

SUMMARY OF THE INVENTION

The present invention is a method for chilling carcasses which substantially overcomes the disadvantages of previously used systems.

It is an object of the present invention to provide a method for lowering carcass temperature as rapidly as possible to slow down bacterial growth;

It is a further object of the present invention to provide a method for chilling carcasses which substantially prevents the natural fluids from dripping out of the carcasses during processing;

It is a further object of the present invention to provide a method for chilling carcasses which tends to reduce the capital cost required for processing carcasses to produce fresh meat.

It is a further object of the present invention to provide a method for chilling carcasses which produces more easily manipulatable carcasses at the end of the chilling process.

The method of chilling carcasses as disclosed in the present invention comprises the steps of:
  a) introducing a cryogenic fluid into a rotatable drum of a meat tumbler, the drum having inner walls which are cooled by the cryogenic fluid;
  b) placing carcasses to be chilled inside the drum;
  c) rotating said drum so that said carcasses contact each other and said inner walls until they are chilled to a sufficient degree.

In the preferred embodiment of the invention the cryogenic fluid is either carbon dioxide gas or nitrogen gas. The cryogenic fluid cools the drum to a temperature of between 32° F. and 38° F., and preferably to a temperature of 32° F. Additional cryogenic fluid may be added during rotation of the drum to maintain the temperature of the drum at the desired level.

A small quantity of water may be introduced into the drum of the tumbler either immediately before or immediately after the introduction of the cryogenic fluid. The water is sufficiently cooled by contacting the inner walls of the drum to form a thin ice layer thereupon, thereby substantially preventing the carcasses from sticking to the inner walls of the drum. The primary chilling of the carcasses takes place between the tumbling carcasses and the ice layer. Additional quantities of water may be added during rotation of the drum to maintain the ice layer on the inner walls.

The carcasses are exposed in the drum to a temperature sufficiently low enough to rapidly chill the exterior surfaces of the carcasses. The drum temperature is, however, not set at a temperature below 32° F. The carcasses are tumbled in the drum for around 60 minutes during which time the carcasses may be subjected to a vacuum or inert gas atmosphere to allow moisture disposed on the exterior surfaces of the carcasses to be reabsorbed into the carcasses to bind with the protein of the meat.

DETAILED DESCRIPTION OF THE PREFERRED EMBODIMENT

After evisceration, or evisceration and exposure to a conventional water chiller, the carcasses are introduced into a meat massager or tumbler. Massagers are rotating drums which are presently used in the meat processing industry to break down meat fibres and tenderize the meat. The massager or tumbler used in the present invention is the MARATHON SUPERTUMBLER TM produced by HMC Heller Meat Systems Consulting GmBH of Augustdorf, West Germany, however, any other suitable tumbler may be used.

In the preferred embodiment of the present invention, a cryogenic fluid, carbon dioxide or nitrogen gas for example, is sprayed into the drum. The cryogenic fluid is sprayed via exteriorly disposed piping through the drum's open door and into the interior of the drum. A tumbler may, however, be modified to spray the cryogenic fluid through interiorly disposed piping.

The cryogenic fluid cools the inner walls of the drum and the temperature of the drum is set at between 32° F. and 38° F., and preferably at 32° F. A very light mist of a small quantity of clean water is sprayed onto the inner wall of the drum. The water may be sprayed into the drum either immediately before or immediately after the introduction of the cryogenic fluid. The water is cooled by contacting the inner walls and forms a thin ice layer upon the inner walls. This ice layer prevents carcasses from sticking to the inner wall and tearing the skin.

A plurality of poultry carcasses are placed into the drum. Cryogenic fluid may be sprayed onto the carcasses themselves to begin the chilling process, or during processing to maintain the temperature within the drum at about 32° F. Water may also be sprayed periodically, or continuously, into the drum to maintain the ice layer on the inner walls. The drum is rotated and the carcasses tumble into contact with each other and with the cold inner walls of the drum. The chilling of the carcasses takes place primarily between the cold inner walls of the drum, or the ice layer, and the tumbling carcasses. As any specific parts of the carcasses are not continuously in contact with the cold inner wall of the drum, or the ice layer, freezing of the carcasses, especially the wings for example, is substantially prevented.

The carcasses are tumbled in the drum at a temperature which is sufficiently low enough to rapidly chill the exterior surfaces of the carcasses, but not at a temperature below 32° F. The carcasses are preferably tumbled in the drum at a temperature of 32° F. for about 60 minutes, producing uniformly chilled carcasses, which have substantially no frozen portions and which are a substantially fresh state. The carcasses in the tumbler do not substantially undergo freezing and thawing.

This tumbling process results in carcasses which are chilled throughout to a substantially uniform temperature of between 32° F. and 34° F. Because the carcasses have spent time in the tumbler, and because the temperature is uniform, when the carcasses exit the tumbler they are easier to manipulate and can be more easily cut up and packaged than carcasses processed in other ways.

During this tumbling process, the carcasses may also be subjected to an inert gas or vacuum atmosphere for a period of 10 to 30 minutes during the 60 minutes of tumbling. This allows any surface moisture or water on the exterior surfaces of the carcasses to be massaged back into the meat protein. The carcasses are preferably tumbled at a temperature of 32° F. as the binding property of protein is maximized at this temperature, even though some binding will still occur at 38° F. The meat and water or moisture on the surface of the carcasses must be maintained above the freezing point in order to get the surface moisture reabsorbed into the skinned carcass. Moisture in the order of approximately 2-4% of carcass weight can be reintroduced into the carcasses in this manner. The inert gas or vacuum atmosphere is required to substantially prevent smearing of the meat.

If the carcasses have been passed through a conventional water chiller prior to being placed in the tumbler, each carcass has moisture or water of between 4% and 16% of carcass weight disposed on its exterior surface. Much of this surface moisture or water must be drained off before the carcasses reach 32° F. This can be accomplished by placing the carcasses in a non-refrigerated tumbler prior to introducing them into the refrigerated tumbler and processing them as described above.

After this process the carcasses can be stored at 32° F. without excessive moisture loss, as the moisture has been reintroduced into the protein of the skin and carcass, and is not merely surface moisture. For extended shelf life, the carcasses could be stored at 28° F.–32° F. Once the moisture is bound with the protein in the carcass, it tends to stay in the meat, thus maintaining the water to protein ratio of fresh poultry throughout processing. A product chilled in this manner is more likely to be juicy when cooked than one which has been processed in another manner which permits dehydration of the carcass to occur. Any moisture reabsorbed by the protein also tends to retard dehydration and discoloration (barking or browning) of the skin should the carcasses be subjected to the long term drying effect of refrigerated storage.

Using a tumbler to accomplish the chilling and equilibration steps in the processing of carcasses tends to save on both space required in processing plants for these steps and in labour costs.

While the invention has been described in conjunction with specific embodiments thereof, it is evident that many alternatives, modifications, and variations will be apparent to those skilled in the art in the light of the foregoing description. Accordingly, it is intended to embrace all such alternatives, modifications and variations, as fall within the spirit and broad scope of the appended claims.

We claim:

1. A method of chilling carcasses, said method comprising the steps of:
   a) introducing a cryogenic fluid into a rotatable drum of a meat tumbler, said drum having inner walls which are cooled by said cryogenic fluid;
   b) placing carcasses to be chilled inside said drum;
   c) rotating said drum so that said carcasses contact each other and said inner walls until they are chilled to a temperature at which the binding property of protein of the carcasses is maximized;
   d) tumbling the carcasses inside the drum in a vacuum or inert gas atmosphere for 10 to 30 minutes to allow moisture on the exterior surfaces of the carcasses to be reabsorbed into the carcasses.

2. A method of chilling carcasses as defined in claim 1, wherein the cryogenic fluid cools the drum to a temperature of between 32° F. and 38° F.

3. A method of chilling carcasses as defined in claim 2, wherein the cryogenic fluid cools the drum to a temperature of about 32° F.

4. A method of chilling carcasses as defined in claim 2, said method further comprising the step of:
  e) spraying additional cryogenic fluid into said drum to maintain the desired temperature.

5. A method of chilling carcasses as defined in claim 1, wherein said cryogenic fluid is carbon dioxide gas.

6. A method of chilling carcasses as defined in claim 1, wherein said cryogenic fluid is nitrogen gas.

7. A method of chilling carcasses as defined in claim 1, further comprising the step of introducing a small quantity of water into said drum either immediately before or immediately after the introduction of said cryogenic fluid; said water being sufficiently cooled by contacting the inner walls of the drum to form a thin ice layer thereupon, thereby substantially preventing the carcasses from sticking to the inner walls of the drum.

8. A method of chilling carcasses as defined in claim 7, wherein said water is sprayed in a fine mist onto the inner walls of the drum.

9. A method of chilling carcasses as defined in claim 7, wherein the primary chilling of the carcasses takes place between the tumbling carcasses and the cold inner walls of the drum.

10. A method of chilling carcasses as defined in claim 7, further comprising the step of introducing additional quantities of water into the drum, after carcasses have been placed inside the drum, to maintain the ice layer on the inner walls.

11. A method of chilling carcasses as defined in claim 1, wherein said carcasses are exposed in the drum to a temperature sufficiently low enough to rapidly chill the exterior surfaces of the carcasses; said temperature not being below 32° F., so that the carcasses are in a substantially fresh state when they exit the drum.

12. A method of chilling carcasses as defined in claim 1, wherein said carcasses are exposed to a temperature of between 32° F. and 38° F., for approximately 60 minutes.

13. A method of chilling carcasses as defined in claim 1, wherein the carcasses are chilled throughout to a uniform temperature of between 32° F. and 34° F.

14. A method of chilling carcasses as defined in claim 1 wherein uniformly chilled carcasses are produced in approximately 60 minutes, said chilled carcasses having substantially no frozen portions.

15. A method of chilling carcasses as defined in claim 1, wherein the exterior surfaces of the carcasses do not substantially undergo freezing and thawing.

16. A method of chilling carcasses as defined in claim 1, wherein the carcasses are tumbled inside the drum at a temperature of 32° F. to 38° F.

17. A method of chilling carcasses as defined in claim 16, wherein the carcasses are tumbled inside the drum at a temperature of 32° F.

18. A method of chilling carcasses as defined in claim 1, wherein the carcasses are tumbled inside the drum for a total time period of 60 minutes.

19. A method of chilling carcasses as defined in claim 1, wherein the carcasses have exited a conventional water chiller immediately prior to being placed in the drum, and each carcass has moisture of between 4%-16% of the carcass weight disposed on its exterior surface; said carcass subsequently being exposed to a vacuum or inert gas atmosphere at a temperature of between 32° F. and 34° F., and having moisture of between 2%-4% of the carcass weight massaged back into the carcass.

20. A method of chilling carcasses as defined in claim 19, wherein the carcasses are tumbled in a non-refrigerated second tumbler after exiting the water chiller and before being placed into the drum of the refrigerated tumbler, said second tumbler being used to drain excess water off the exterior surface of the carcasses.

21. A method of chilling carcasses as defined in claim 1, wherein the carcasses which are chilled in the drum of the tumbler are poultry carcasses.

* * * * *